(12) United States Patent
O'Brien (10) Patent No.: US 8,761,095 B1
(45) Date of Patent: Jun. 24, 2014

(54) METHOD AND APPARATUS FOR DYNAMICALLY ADJUSTING TRAFFIC QOS IN ACCORDANCE WITH ON-DEMAND REQUEST

(75) Inventor: Christopher V. O'Brien, North Aurora, IL (US)

(73) Assignee: Tellabs, Inc., Naperville, IL (US)

( * ) Notice: Subject to any disclaimer, the term of this patent is extended or adjusted under 35 U.S.C. 154(b) by 473 days.

(21) Appl. No.: 12/858,872

(22) Filed: Aug. 18, 2010

(51) Int. Cl.
*H04W 4/00* (2009.01)

(52) U.S. Cl.
USPC .................. 370/329; 370/395.21; 370/395.43

(58) Field of Classification Search
USPC .................. 370/230, 230.1, 231, 235, 395.42
See application file for complete search history.

(56) References Cited

U.S. PATENT DOCUMENTS

| | | | | |
|---|---|---|---|---|
| 5,933,425 A | * | 8/1999 | Iwata | 370/351 |
| 2002/0031094 A1 | * | 3/2002 | Nitta | 370/252 |
| 2002/0152319 A1 | * | 10/2002 | Amin et al. | 709/232 |
| 2005/0088977 A1 | * | 4/2005 | Roch et al. | 370/254 |
| 2008/0081593 A1 | * | 4/2008 | Moon et al. | 455/408 |

\* cited by examiner

*Primary Examiner* — Alvin Zhu
(74) *Attorney, Agent, or Firm* — James M. Wu; JW Law Group (57) ABSTRACT

A method and apparatus for dynamically adjusting traffic quality of service ("QoS") on-demand over a communications network are disclosed. The process, in one embodiment, is configured to receive an enhanced QoS request from a user via a first node over a communications network. Upon prioritizing traffic flow in accordance with the enhanced QoS request, the enhanced QoS request associated with the first node is recorded. Upon acknowledging the enhanced traffic QoS, the process routes the information to the first node in accordance to a predefined enhanced QoS.

20 Claims, 6 Drawing Sheets

METHOD AND APPARATUS FOR DYNAMICALLY ADJUSTING TRAFFIC QOS IN ACCORDANCE WITH ON-DEMAND REQUEST

FIELD

The technical field of embodiments of the present invention relate to communication networks. More specifically, embodiments of the present invention relate to providing traffic priority in accordance with on-demand requests.

BACKGROUND

With increasing demand for more information to be supplied to homes and/or businesses, many network communication providers are switching or upgrading their networks to high-speed communication signaling protocol, such as Digital Signal 3 ("DS3") or T3. High-speed communication signaling protocol typically enhances bandwidth and speed for audio, video, and data transmission to/from homes and/or businesses. For the mobile communication industry, wireless providers are transitioning from a traditional GSM, Ethernet, packet-based data services, and/or 2 G wireless service using T1 interfaces to more data intensive 3 G or 4 G services. With exploding growth of mobile users as well as wired data communication, users and carriers are trying to meet such growing demand with fatter pipes as well as altering traffic quality of service ("QoS").

A conventional packet-switching network typically offers finite bandwidth capacity for transporting information or packets between sources and destinations. When a packet travels through a communication network from a source to a destination, it could encounter various problems such as packet drop, packet jitter, out-of-order packet delivery, arrival delay, and so forth. The performance of a communication network can vary depending on the number of users or traffic loading associated with the network. For example, with relatively heavy loading on shared network resources, the throughput or bit rate that can be provided to certain data streams or flows can be too low for voice, video, and/or multimedia services when all data streams or flows have the same traffic priority. When a traffic priority for a particular path or flow is set, the priority typically does not change until a carrier decides to update.

SUMMARY

A process and/or network device capable of dynamically adjusting traffic quality of service ("QoS") on-demand over a communications network is disclosed. The process, in one embodiment, is configured to receive an enhanced QoS request from a user via a first node over a communications network. Upon prioritizing traffic flow in accordance with the enhanced QoS request, the enhanced QoS request associated with the first node is recorded. Upon acknowledging the enhanced traffic QoS, the process routes the information to the first node in accordance to a predefined enhanced QoS.

Additional features and benefits of the exemplary embodiment(s) of the present invention will become apparent from the detailed description, figures and claims set forth below.

BRIEF DESCRIPTION OF THE DRAWINGS

Exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described herein in the context of a method, system and apparatus of adjusting traffic quality of service ("QoS") on-demand for resetting one or more traffic priority flows.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

References to "one embodiment," "an embodiment," "example embodiment," "various embodiments," "exemplary embodiment," "one aspect," "an aspect," "exemplary aspect," "various aspects," et cetera, indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the interest of clarity, not all of the routine features of the implementations described herein are shown and described. It will, of course, be understood that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of this disclosure.

In accordance with the present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardwired devices, field programmable gate arrays (FP- GAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure unless otherwise defined.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Embodiment(s) of the present invention discloses a mechanism of dynamically adjusting traffic QoS on-demand over a communications network is disclosed. After receiving an enhanced QoS request from a user via a node over a communications network, the process prioritizes the traffic flow in accordance with the enhanced QoS request. Upon recording the enhanced QoS request associated with the node, the process routes the information to the first node in accordance to a predefined enhanced QoS.

Figure 1:
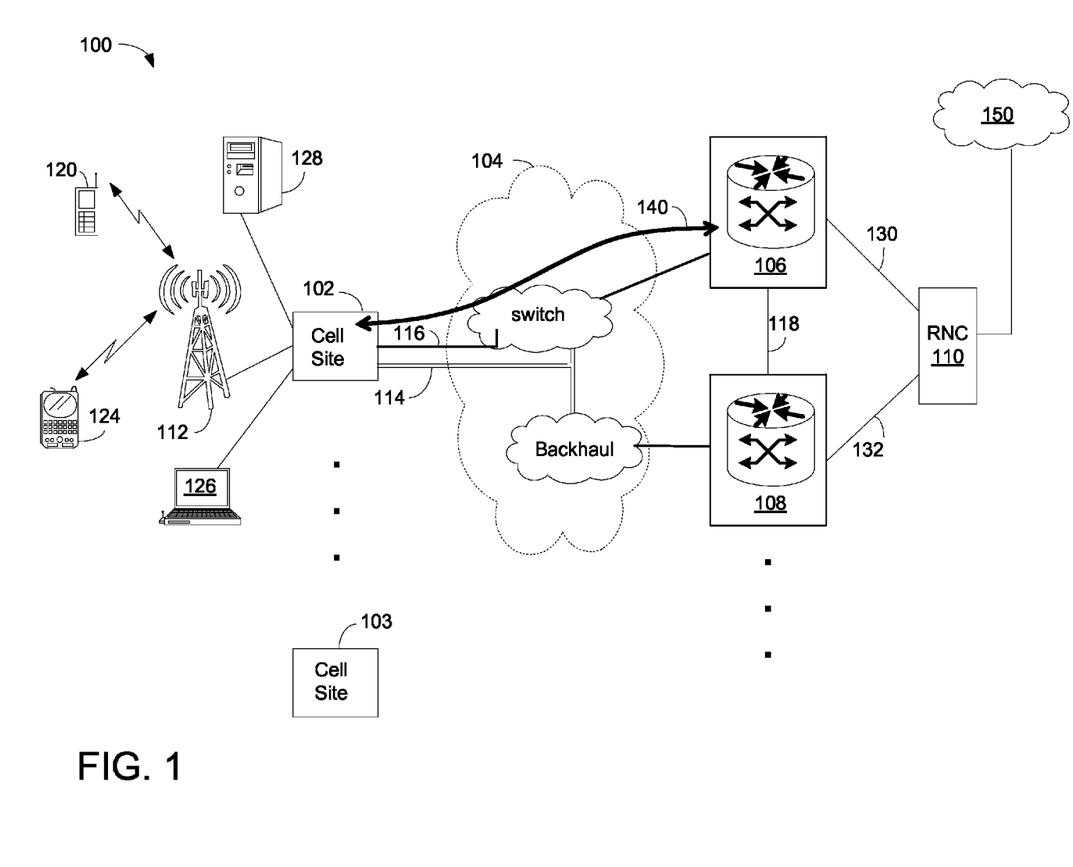
FIG. 1 is a block diagram illustrating a computer network having one or more routers capable of performing traffic priority on-demand in accordance with one embodiment of the present invention.

FIG. 1 is a block diagram 100 illustrating a computer network having one or more routers capable of performing traffic priority on-demand in accordance with one embodiment of the present invention. Diagram 100 includes multiple cell sites 102-103, a switching network 104, multiple routers 106-108, and a Radio Network Controller ("RNC") 110. RNC 110 is further coupled with a Wide Area Network ("WAN") and/or Internet 150. Depending on the applications, RNC 110 may be coupled with other RNC or RNCs to enhance network management and capacities. Connections 130-132 are used to couple RNC 110 with routers 106-108 wherein connections 130-132 can be wired lines connections, wireless connections, or a combination of wired lines and wireless connections. It should be noted that the underlying concept of the exemplary embodiment(s) of the present invention would not change if one or more blocks (or circuits) were added to or removed from diagram 100.

Each router such as router 106 or 108, in one example, is prioritized in a sequential order. A router with the highest priority is the master router. A router is configured to route data traffic between sources and destinations. The routers such as routers 106-108 are interconnected by Interior Gateway Protocol ("IGP") 118. Each router, for example, includes functions of IP routing. In one embodiment, a router such as router 106 includes a QoS management, not shown in FIG. 1, capable of enhancing traffic priority for a traffic flow 140 upon receipt of an on-demand request. Traffic flow 140, in one aspect, includes a priority channel established between cell site 102 and router 106.

Switching network 104, as indicated in FIG. 1, is capable of transporting information between circuit-based clients and packet-switching clients. Switching network 104 can be an IP and/or Multi Protocol Label Switching ("MPLS") based switching network which may operate at a layer of Open Systems Interconnection Basic Reference Model ("OSI model"). In one aspect, network 104 includes a switch block and a backhaul block used for transferring information and/or various data traffic to and from network clients. Network client in one example may include one or more routers, switches, hosts, base stations, and the like. Network 104 is capable of routing information between cell sites 102-103 and RNC 110 via routers 106-108. For example, while the switch block of network 104 transmits information between cell site 102 and router 106 via bus 116, the backhaul block of network 104 transmits information between cells site 102 and router 108 via bus 114.

Cell site 102, also known as a base station or node B, includes a radio tower 112, a computer 126, and a server 128, wherein radio tower 112 is further coupled to a cellular phone 120 and a handheld device 124 via wired or wireless communications. Cell site 102 is capable of communicating with mobile devices such as cellular phone 120 and handheld device 124 via radio tower 112. It should be noted that cell site 102, not shown in FIG. 1, may include additional radio towers as well as other land switching circuitry. The cell stations such as cell sites 102-103 can be configured to support wireless communications as well as wired communications.

An advantage of employing a QoS management is to allow end mobile devices to communicate with the carries data path solution to request priority on-demand. For example, a voice-over-Internet-protocol ("VoIP") application running on an iPhone® could run on a premium mode that prioritizes itself over anyone not paying for a premium mode or on another application like Netflix™. The QoS can also benefit high end users in quality access, and receive overall quality of a carrier service.

Figure 2A:
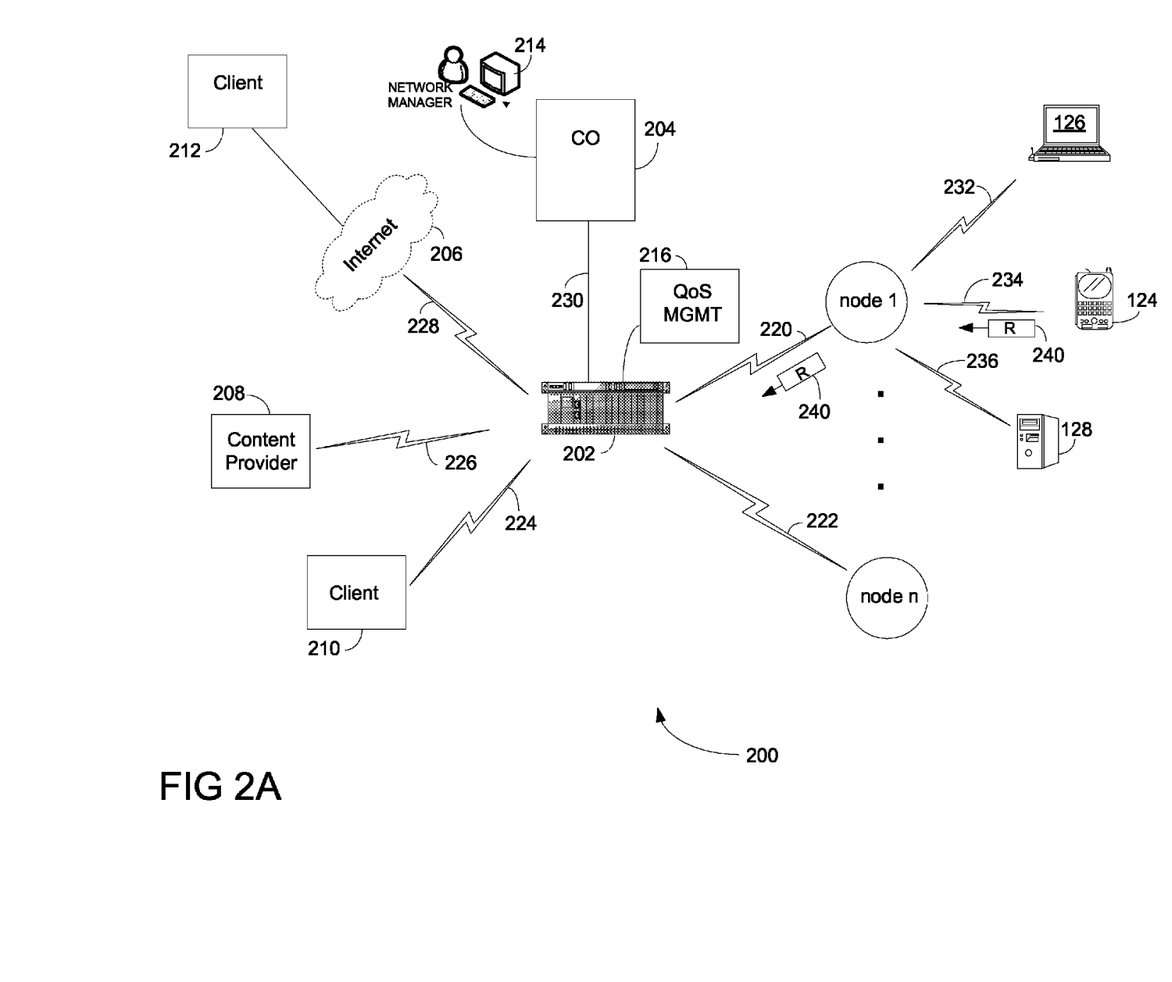
FIGS. 2A-B are block diagram illustrating an exemplary communications network capable of handling traffic priority on-demand in accordance with one embodiment of the present invention.

FIG. 2A is a block diagram 200 illustrating an exemplary communications network capable of handling traffic priority on-demand in accordance with one embodiment of the present invention. Diagram 200 includes a router 202, a central office 204, a content provider 208, clients 210-212, and network nodes. In a communications network, a physical network node or node can be a network equipment such as a router, modem, hub, bridge, switch, handset, computer, server, workstation, et cetera. Node 1, for example, can be a network entity capable of coupling to computer 126, portable device 124, and server 128 via connections 232-236. It should be noted that the underlying concept of the exemplary embodiment(s) of the present invention would not change if one or more blocks (or devices) were added to or removed from diagram 200.

Router 202, in one embodiment, includes a QoS management 216 which is capable of adjusting traffic priority for a traffic flow in response to an on-demand request requested by a user through a node. A network manager 214 is able to communicate with router 202 via central office 204. In one aspect, central office 204 is coupled to router 202 via connection 230. Alternatively, central office 204 can be configured to reside within router 202. Router 202 is also capable of providing routing services to remote clients such as client 212 via Internet 206. Connections 220-228, which can be either wired, wireless, or a combination wired and wireless cables, are employed to couple clients 210-212, content provider 208, and nodes to router 202. Note that client(s) can be servers, routers, switches, computers, user's equipments, network equipments, websites, and so forth.

During an operation, router 202 is responsible to route data or packets between connected devices and/or nodes such as clients and nodes using a predefined QoS or predefined traffic priorities to ensure smooth routing. Upon issuing an on-demand request 240 issued by portable device 124, node 1 processes the request and transmits on-demand request 240 to router 202 via connection 220. After processing on-demand request 240, router 202 grants the on-demand request and broadcasts the grant to various network devices for facilitating prioritized data transfer.

One advantage of using QoS management 216 is to allow end customer or user applications running on a mobile device to dynamically request higher priority for its data traffic over other traffics. In addition, QoS management 216 is able to track and create a payment/charge hierarchy to record on-demand services thereby the on-demand service can be billed or charged accordingly. For example, when a person is expecting an important call, he or she could temporarily increase the VoIP QoS on his or her device to ensure the flow is prioritized over its neighbors for music streaming. Another example would be business users working on a presentation or contract that needs to be sent to a customer at the last minute in which the transmission can be prioritized to ensure that the customer receives the presentation or contract without delay.

Figure 2B:
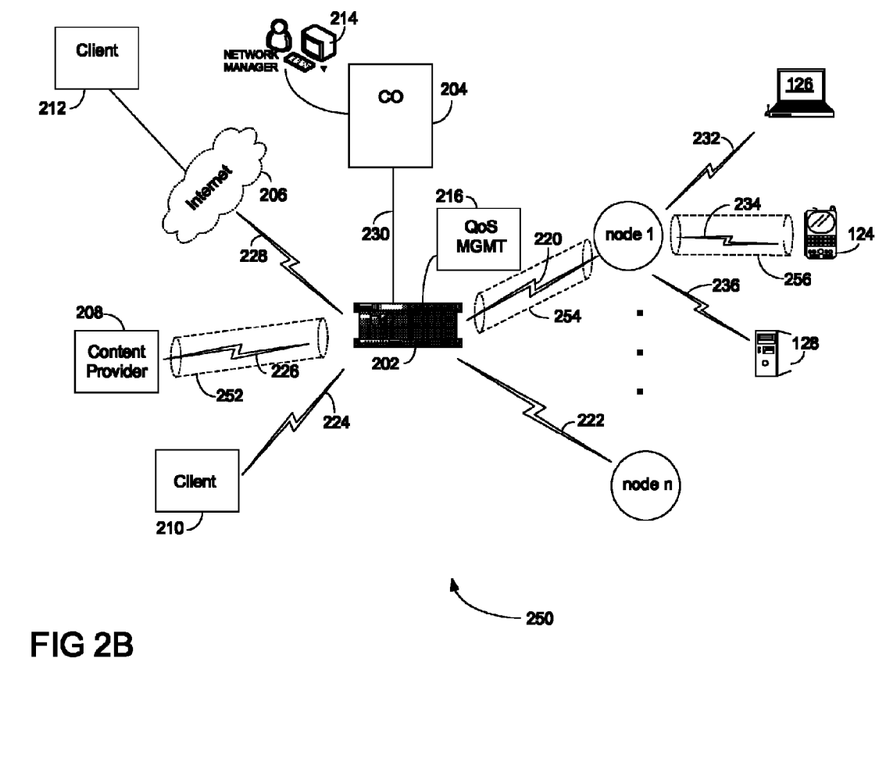

FIG. 2B is a block diagram 250 illustrating an exemplary communications network having a QoS management 216 capable of handling traffic priority on-demand in accordance with one embodiment of the present invention. Diagram 250, in one aspect, includes a router 202, a central office 204, a content provider 208, clients 210-212, and network nodes. In a communications network, a physical network node or node is network equipment such as a router, modem, hub, bridge, switch, handset, computer, server, workstation, et cetera. Node 1, for example, can be a network entity capable of coupling to computer 126, portable device 124, and server 128 via connections 232-236 for data or signal communications. It should be noted diagram 250 illustrates similar features as diagram 200 except that traffic flows between content provider 208 and portable device 124 are prioritized.

After receipt of an on-demand request, router 202 establishes a prioritized traffic channel or priority channel 252-256 between content provider 208 and portable device 124 in accordance with the request. Priority channel 252-256 is able to provide a higher prioritized QoS for the packets travel between content provider 208 and portable device 124. For example, if a user of portable device 124 watches a live footfall game from device 124, the user can request an enhanced QoS from content provider 208 such as a local television station for non-interrupted data streaming service until the game is over. Upon checking the availability of the higher QoS, router 202 grants the on-demand request and subsequently broadcasts the grant to various network devices such as node 1 and content provider 208 to facilitate prioritized data streaming.

Figure 3:
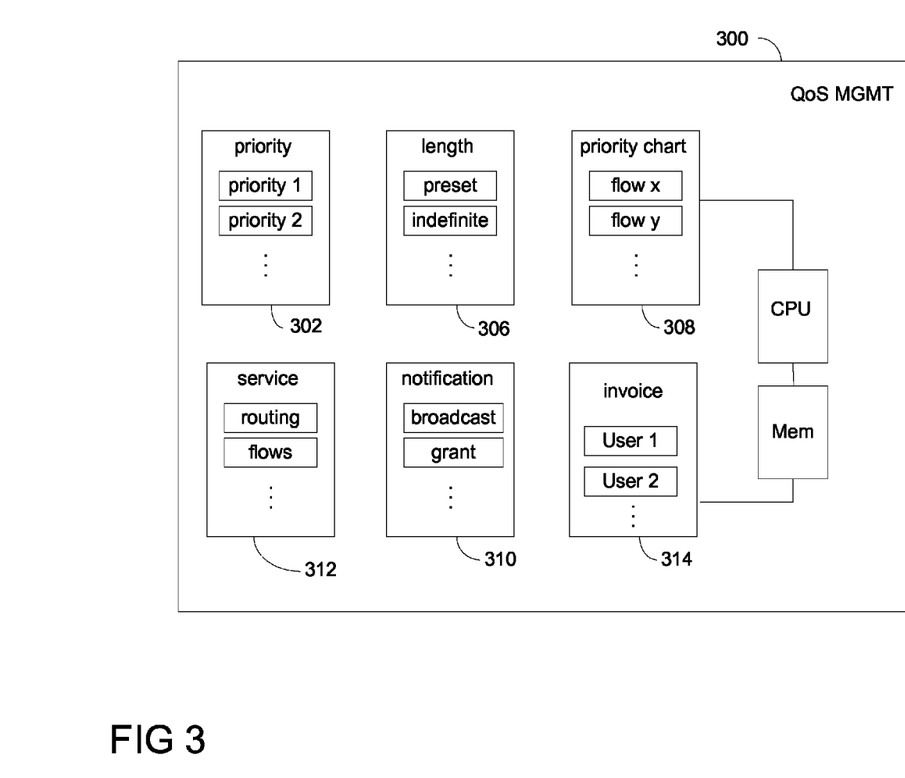
FIG. 3 is a logic block diagram illustrating a QoS management capable of providing on-demand priority adjustment in accordance with one embodiment of the present invention.

FIG. 3 is a logic block diagram illustrating a QoS management 300 capable of providing on-demand priority adjustment in accordance with one embodiment of the present invention. QoS management 300 includes a priority module 302, length module 306, priority chart 308, service module 312, notification module 310, and billing module 314. Modules 302-312 may be further divided into smaller modules or merged into larger modules. It should be noted that the underlying concept of the exemplary embodiment(s) of the present invention would not change if one or more blocks (or modules) were added to or removed from QoS management 300.

QoS management 300, which can be a software, hardware, or combination of hardware and software component, is able to adjust traffic QoS in accordance with an on-demand priority request from an end user. In one aspect, QoS management 300 is capable of providing a different level of QoS in order to guarantee a throughput level. For example, Asynchronous Transfer Mode ("ATM") based data transfer can support different levels of QoS, which limits end-to-end latency to a predefined time frame. Note that ATM is a network protocol or technology capable of transferring data in packet formats which have predefined fixed sizes. ATM allows video, audio, and computer data to be transmitted over the same network circuit. To simplify forgoing description, ATM is herein used to describe as a network protocol for various embodiments of the present invention. It should be noted that other types of network transferring protocol can be used in place of ATM.

To identify an on-demand priority request, QoS management 300 activates priority module 302 to identify the types of priority which is requested and initiates length module 306 to determine how long the prioritized QoS needs to be maintained in accordance with the on-demand request. After checking priority chart 308 to determine the availability of prioritized QoS, service module 312 determines a type of network service to be used to establish the priority channel. Upon notifying the grant of prioritized QoS to a particular flow, the priority service(s) is recorded for billing to an account at a later time.

Priority module 302, in one embodiment, includes a list of prioritized QoS capable of identifying or dictating levels of traffic priorities to be used. For example, during an ATM network service, priority module 302 may have a list of prioritized QoS including unspecified bit rate ("UBR"), available bit rate ("ABR"), variable bit rate ("VBR"), constant bit rate ("CBR"), wherein CBR has the highest priority while UBR has the lowest priority. While CBR employs a fixed bit rate to provide a steady stream, VBR provides a predefined throughput capacity despite the data packets may not be sent evenly. ABR usually guarantees minimum capacity for data transmission and permits data packet to be sent at a higher rate or a burst rate when the network is available. UBR offers a data transmission with no guarantee to any throughput levels. In one aspect, priority module 302 selects a type of prioritized QoS after identifying a higher QoS for a specified flow in the on-demand request. In one example, the on-demand request identifies a level of QoS such as CBR or UBR for a specified flow or routing path.

Length module 306, in one aspect, manages duration of a priority channel capable of delivering prioritized QoS that should be maintained in accordance with the on-demand request. The duration of a priority channel can be determined by a predefined time frame once the on-demand request is processed. For example, upon granting of prioritized QoS, a priority channel is established and maintained for a predefined or preset duration such as two (2) hours. Alternatively, the duration may be set to the length of a selected program such as a football game. For instance, the priority channel ends when a selected football game ends. The duration or length of a priority channel can also be set indefinitely or permanently until a request for resetting is received. In another embodiment, length module 306 warns the end user that his or her prioritized QoS is about to be prematurely terminated due to other higher priority requesters. Upon noticing the warnings, the user can optionally requests a higher prioritized QoS to maintain the service or gets ready to be bump-off.

Priority Chart 308 shows an up-limit or maximum allowed priority channels that can be concurrently running without impeding regular unprioritized data traffics. A Chart is used to record or list currently running priority channels and a number of available priority channels that can be assigned. In one aspect, priority chart 308 is also capable of providing queuing capability that allows a user to preorder prioritized QoS on a specific time period such as a Super Bowl game time. In one embodiment, priority chart 308 is able to check the chart and identify the availability of the prioritized QoS in response to the on-demand request.

Service module 312 is configured to determine how to provide identified prioritized QoS in accordance with the on-demand request upon determining the type of priority, duration, and availability of prioritized QoS. To set a prioritized QoS, service module 312 establishes a preferred routing path, bandwidth enhancement, additional flow, congestion avoidance, or a combination of preferred routing path, bandwidth enhancement, and/or additional flow.

Notification module 310, in one embodiment, communicates with other network devices or equipments to facilitate higher prioritized QoS for one or more specified flows. For example, notification module 310 notifies or negotiates with relevant nodes or devices to upgrade certain QoS in accordance with one or more on-demand requests. Notification module 310 is also capable of notifying an end user that his or her service has been upgraded to a requested QoS. In one embodiment, notification module 310 is also capable of providing an option allowing a user to further upgrade his or her services via an on-demand request with a higher priority of QoS.

Invoice module 314, which can be a background application, records various on-demand requests and the duration of prioritized QoS to accounts or users' accounts. Invoice module 314 will use its recorded data to bill or invoice users for the higher prioritized QoS. In one aspect, invoice module 314 enables a carrier or provider to charge a fee for providing higher QoS based on the recorded or measured usage of the service.

QoS management 300, in one embodiment, includes digital processor(s), controllers, and memories capable of performing functions described in priority module 302, length module 306, priority chart 308, service module 312, notification module 310, and invoice 314. Note that the functions described in modules 302-314 can be separated into more detailed tasks or merged into a larger function or functions depending on the applications. Additional logic blocks may also be added to QoS management 300 to facilitate and provide higher QoS.

Figure 4:
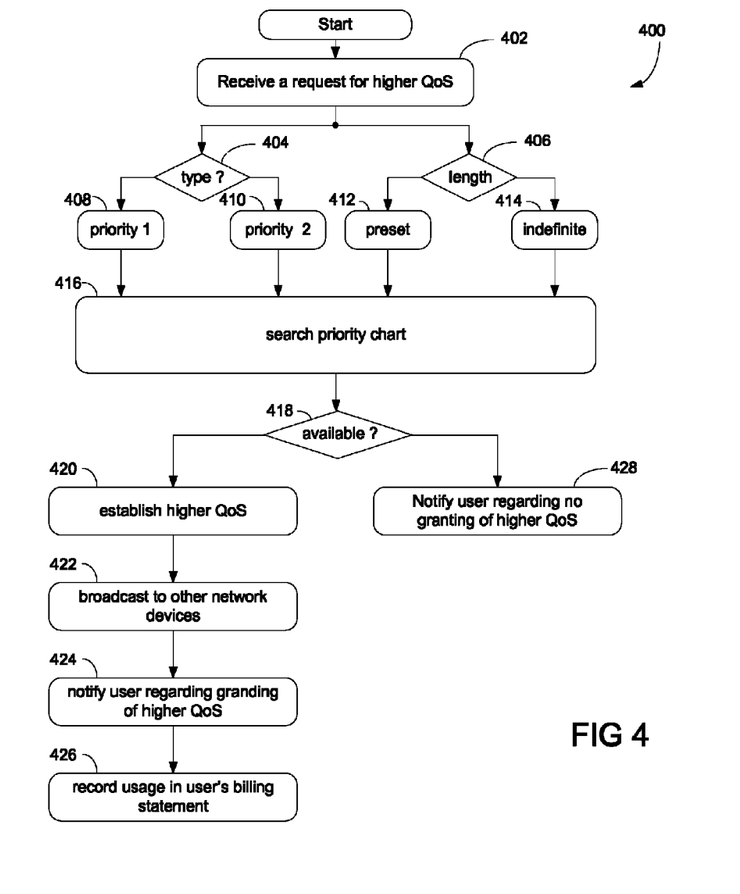
FIG. 4 is a flowchart illustrating a process of performing traffic priority on-demand in accordance with one embodiment of the present invention.

FIG. 4 is a flowchart 400 illustrating a process of performing traffic priority on-demand in accordance with one embodiment of the present invention. Upon receipt of an on-demand request for higher QoS from a user at block 402, the process identifies types of priority at block 404 and length of the priority service at block 406. If the prioritized QoS is priority 1 which may be UBR service, the process proceeds to block 408. If the priority is 2 such as a CBR service, the process proceeds to block 410. Note that additional priority types can be added at block 404.

If the length of the prioritized service is preset or predefined, the process moves to block 412 to identify the duration. Alternatively, if the length of the prioritized service is indefinite, the process proceeds to block 414 to ensure that the priority channel is set permanently until a request for resetting is received. Note that additional types of duration controls may be added at block 406.

Upon search through the priority chart at block 416, the process exams whether the requested prioritized QoS is available at block 418. If it is available, the process proceeds to block 420 to establish higher QoS for a specified flow including setting up a priority channel. At block 422, the process broadcasts the grant of higher QoS to related or associated nodes or network devices. Upon notifying the user at block 424 about granting of the prioritized QoS, the process records the usage of the prioritized QoS at block 426. The measured usage is subsequently used for billings. If the prioritized QoS is not available at block 418, the process proceeds to block 428 and notifies the user that his or her requested QoS is denied.

It should be noted that the embodiments of the present invention are configured to work with application programming interfaces ("APIs") or standardizing APIs provided by network gear to allow per flow prioritization. APIs may be accessible by end mobile devices in the development environments for applications on portable devices. To alleviate the need to work on multiple platforms of APIs, development environments, for example, may create an application capable of running in the background, which allows a user (or users) to choose a priority (or priorities) for the application(s).

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components. While embodiments of the present invention will be described with reference to the Internet, the method and apparatus described herein is equally applicable to other network infrastructures or other data communications environments.

Figure 5:
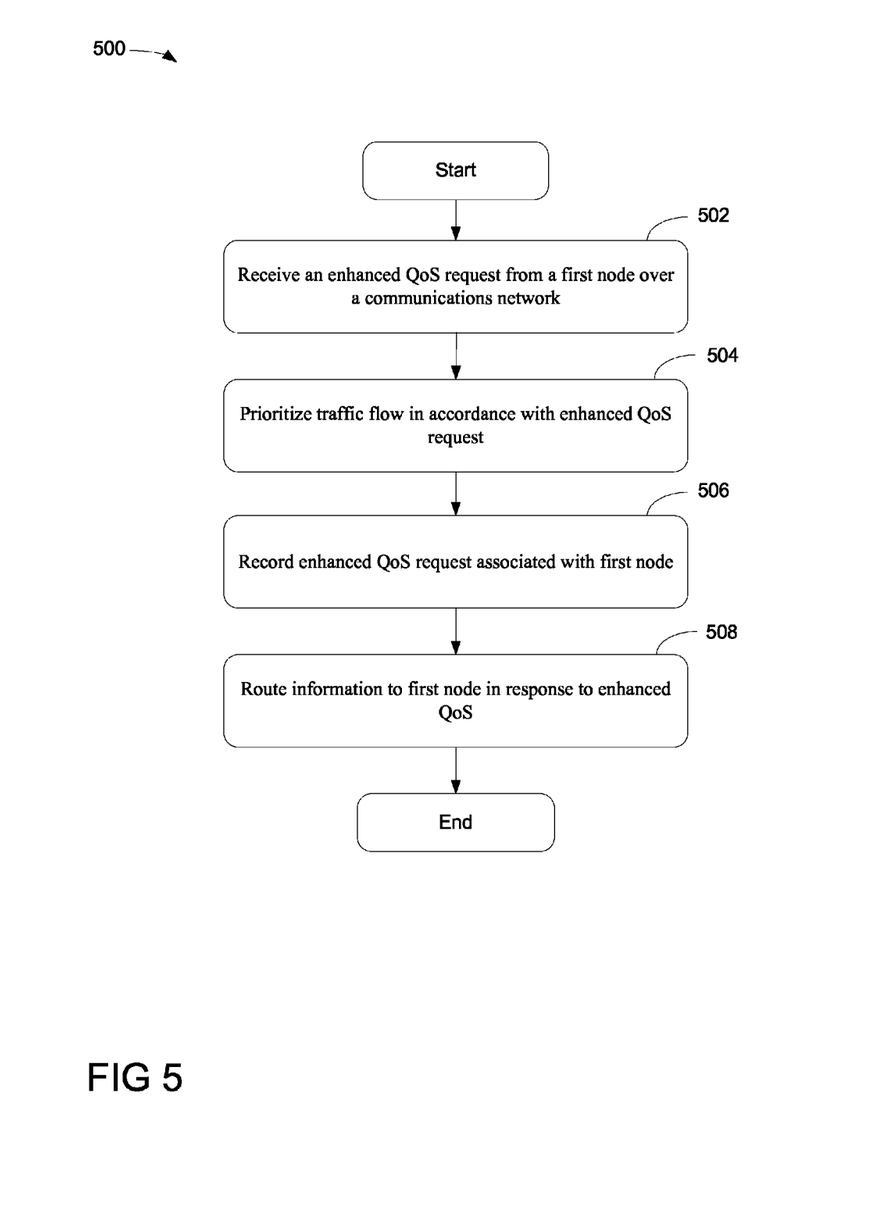
FIG. 5 is a flowchart illustrating a process for providing a traffic priority according to a user's demand in accordance with one embodiment of the present invention.

FIG. 5 is a flowchart 500 illustrating a process for providing a traffic priority according to a user's demand in accordance with one embodiment of the present invention. At block 502, a process capable of adjusting QoS receives an enhanced QoS request or an on-demand higher QoS request from a node or first node over a communications network. Additional information such as priority type and user identity is also received from the first node in response to the enhanced QoS request. After identifying the user and the tasks, the process identifies a second node or destination node that is indicated by the request. It should be noted that various authentication and/or validation steps may be added in the process after receiving a user's demand.

At block 504, upon verifying the availability of higher prioritized QoS in according to the enhanced QoS request, the specified traffic flow is prioritized. In one example, a priority channel is established between the first and second nodes. The process, in one embodiment, includes a timer capability that is able to measure usage(s) of prioritized QoS by a user (s). The process is also configured to broadcast the prioritized traffic flow(s) to relevant node(s), and notify the user with a priority acknowledgement via the first node.

At block 506, the process is configured to analyze/process the usage measurement of prioritized QoS and records the usage to user's account(s) for billing purposes. It should be noted that the different prioritized QoS is charged at different price.

At block 508, the process routes the information or packets between the first and second nodes in accordance to an identified prioritized QoS. When the duration of the prioritized QoS expires, the normal un-prioritized QoS resumes for the traffic flow. In one aspect, the process forwards a normal priority notification to the user via the first node. The duration of the prioritized QoS may be specifically identified by the enhanced QoS request.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for adjusting quality of service ("QoS"), comprising:
    receiving an enhanced QoS request from a user's device via a first node over a communications network;
    identifying requested prioritized QoS and duration associated with the requested prioritized QoS in accordance with the enhanced QoS request;
    determining availability of priority channels listed in a priority chart in a local storage relating to the prioritized QoS and the duration in accordance with the enhanced QoS request;
    prioritizing traffic flow associated to the enhanced QoS request to the prioritized QoS when at least one priority channel is available according to the priority chart;
    establishing a priority channel between the user's device and a content provider via the first node; and
    routing traffic flow associated to the enhanced QoS request via the priority channel in accordance to the prioritized QoS.

2. The method of claim 1, further comprising notifying the user with a priority acknowledgement via the first node.

3. The method of claim 2, further comprising:
    resuming traffic flow to a normal priority when prioritized QoS expires; and
    forwarding a normal priority notification to the first node.

4. The method of claim 1, wherein receiving an enhanced QoS request further includes:
    identifying a user account associated with the user; and
    determining a second node that is identified in the enhanced QoS request to communicate with the first node.

5. The method of claim 1, wherein prioritizing traffic flow includes identifying availability of high prioritized QoS.

6. The method of claim 5, wherein prioritizing traffic flow includes identifying level of priority needed in response to the enhanced QoS request.

7. The method of claim 1, wherein recording usage of the prioritized QoS includes generating billing statement in response to measured usage of prioritized QoS.

8. The method of claim 1, further comprising broadcasting the prioritized QoS to one or more network devices.

9. The method of claim 1, wherein routing information to the first node includes:
    upgrading traffic priority in accordance with the prioritized QoS; and
    adjusting routing paths to forward packets for the traffic priority.

10. A communications network, comprising:
    a first node coupled to a communications network and capable of initiating an enhanced Quality of Service ("QoS") request on-demand;
    a router coupled to the first node and configured to route data stream, the router including:
    a client capable of receiving the enhanced QoS request;
    a priority chart indicating a list of currently running priority channels and a number of available priority channels able to be assigned for handling prioritized data flows within the communications network;
    a length module able to grant a plurality of prioritized traffic channels between a user's device and a content provider based on duration requested by the enhanced QoS request; and
    a prioritizer able to prioritize data stream associated with the enhanced QoS request.

11. The network of claim 10, further includes a second node coupled to the communications network and capable of communicating with the first node in accordance with the enhanced QoS request.

12. The network of claim 11, wherein the first node is a computer, a server, a mobile device, or a cluster of systems configured to allow a user or users to access the communications network.

13. The network of claim 12, wherein the second node is one of a computer, a website, application provider, a network carrier, and a content provider.

14. The network of claim 10, wherein the QoS request is a user initiated priority data flow request to a network carrier for a predefined data transmission bandwidth.

15. The network of claim 10, wherein the client is a network module configured to listen to an enhanced QoS request over the communications network.

16. The network of claim 10, wherein the priority chart is stored in a memory for tracking prioritized data flows in the communications network.

17. The network of claim 10, wherein the prioritizer assigns higher priority to data stream associated with the enhanced QoS request.

18. A network router, comprising:
    a priority module configured to identify priority type associated with an on-demand request of higher quality of service ("QoS");
    a length module coupled to the priority module and configured to determine duration of requested prioritized QoS associated with the on-demand request;
    a priority chart coupled to the length module and configured to save prioritized flows currently running and list a number of available priority channels that can be assigned for serving on-demand request; and
    a service module coupled to the priority chart and capable of selecting a traffic service to deliver data stream with requesting higher QoS based on requested duration and availability of priority channels.

19. The router of claim 18, further comprising a notification module coupled to the service module and capable of broadcast information relating to a grant of prioritized services associated with the on-demand request.

20. The router of claim 19, further comprising an invoice module coupled to the service module and capable of recording measured usage of prioritized service in connection to one or more user accounts.

* * * * *